(12) United States Patent
Downing et al.

(10) Patent No.: US 7,576,920 B2
(45) Date of Patent: Aug. 18, 2009

(54) TRANSFORMABLE, APPLICABLE MATERIAL AND METHODS FOR USING SAME FOR OPTICAL EFFECTS

(75) Inventors: Elizabeth A. Downing, Sunnyvale, CA (US); Mark G. Willner, Lafayette, CO (US); Robert Rewick, Mountain View, CA (US)

(73) Assignee: 3DTL, Inc., Sunnyvale, CA (US)

( * ) Notice: Subject to any disclaimer, the term of this patent is extended or adjusted under 35 U.S.C. 154(b) by 18 days.

(21) Appl. No.: 11/710,095

(22) Filed: Feb. 23, 2007

(65) Prior Publication Data

US 2007/0171492 A1 Jul. 26, 2007

Related U.S. Application Data

(63) Continuation of application No. 11/207,275, filed on Aug. 19, 2005, now Pat. No. 7,233,446.

(60) Provisional application No. 60/603,143, filed on Aug. 19, 2004.

(51) Int. Cl.
*G02B 3/00* (2006.01)
*G02B 5/18* (2006.01)
(52) U.S. Cl. ..................... 359/642; 359/558
(58) Field of Classification Search ............. 359/14–20, 359/619, 642, 558, 569–576
See application file for complete search history.

(56) References Cited

U.S. PATENT DOCUMENTS

| 3,536,370 | A | | 10/1970 | Post .......................... 359/20 |
| 4,084,880 | A | | 4/1978 | Clow .......................... 359/15 |
| 4,172,646 | A | | 10/1979 | Matsumoto ................. 396/271 |
| 4,830,441 | A | * | 5/1989 | Chang ......................... 359/15 |
| 4,998,787 | A | | 3/1991 | Caputi et al. ................. 359/20 |
| 5,235,441 | A | * | 8/1993 | Georgaras et al. ............ 359/15 |
| 5,278,679 | A | * | 1/1994 | Davis et al. ................. 359/19 |
| 6,381,072 | B1 | | 4/2002 | Burger ....................... 359/622 |
| 2004/0027675 | A1 | | 2/2004 | Wu et al. ..................... 359/619 |

OTHER PUBLICATIONS

PCT International Search Report and Written Opinion for PCT International Appln. No. US2006/032344, mailed Dec. 18, 2006 (10 pages).

* cited by examiner

*Primary Examiner*—Mohammed Hasan
(74) *Attorney, Agent, or Firm*—Blakely, Sokoloff, Taylor & Zafman LLP

(57) ABSTRACT

Optical elements and methods of forming optical elements are described. In one example, a method applies a photosensitive ink to a substrate and exposes the ink to create an optical element, such as an optical lens or holographic recording medium.

14 Claims, 3 Drawing Sheets

TRANSFORMABLE, APPLICABLE MATERIAL AND METHODS FOR USING SAME FOR OPTICAL EFFECTS

This application is a continuation of U.S. patent application Ser. No. 11/207,275, filed on Aug. 19, 2005 now U.S. Pat. No. 7,233,446, and also claims priority to U.S. Provisional Patent Application No. 60/603,143, which was filed on Aug. 19, 2004.

FIELD OF THE INVENTION

The present invention relates to optical elements such as lenses.

BACKGROUND OF THE INVENTION

Prior art lenses are created by grinding glass into a desired shape to achieve the desired optical element. Grinding is a mechanical process which is expensive and time consuming and requires great care and precision if an optical element is to be formed within a small tolerance of certain optical properties (e.g. its focal length, etc.). It is desirable to provide alternative techniques which are potentially easier and less expensive.

SUMMARY OF THE DESCRIPTION

Various examples of optical elements, which are formed by exposing a photosensitive material to electromagnetic radiation, are described. The optical elements are generally designed to allow visible light (e.g. light having wavelengths in the range of about 400 nm to about 800 nm; such light is visible to most humans) to pass through the optical element or to reflect from (and/or interact with) the optical element.

DESCRIPTION

Figure 1:
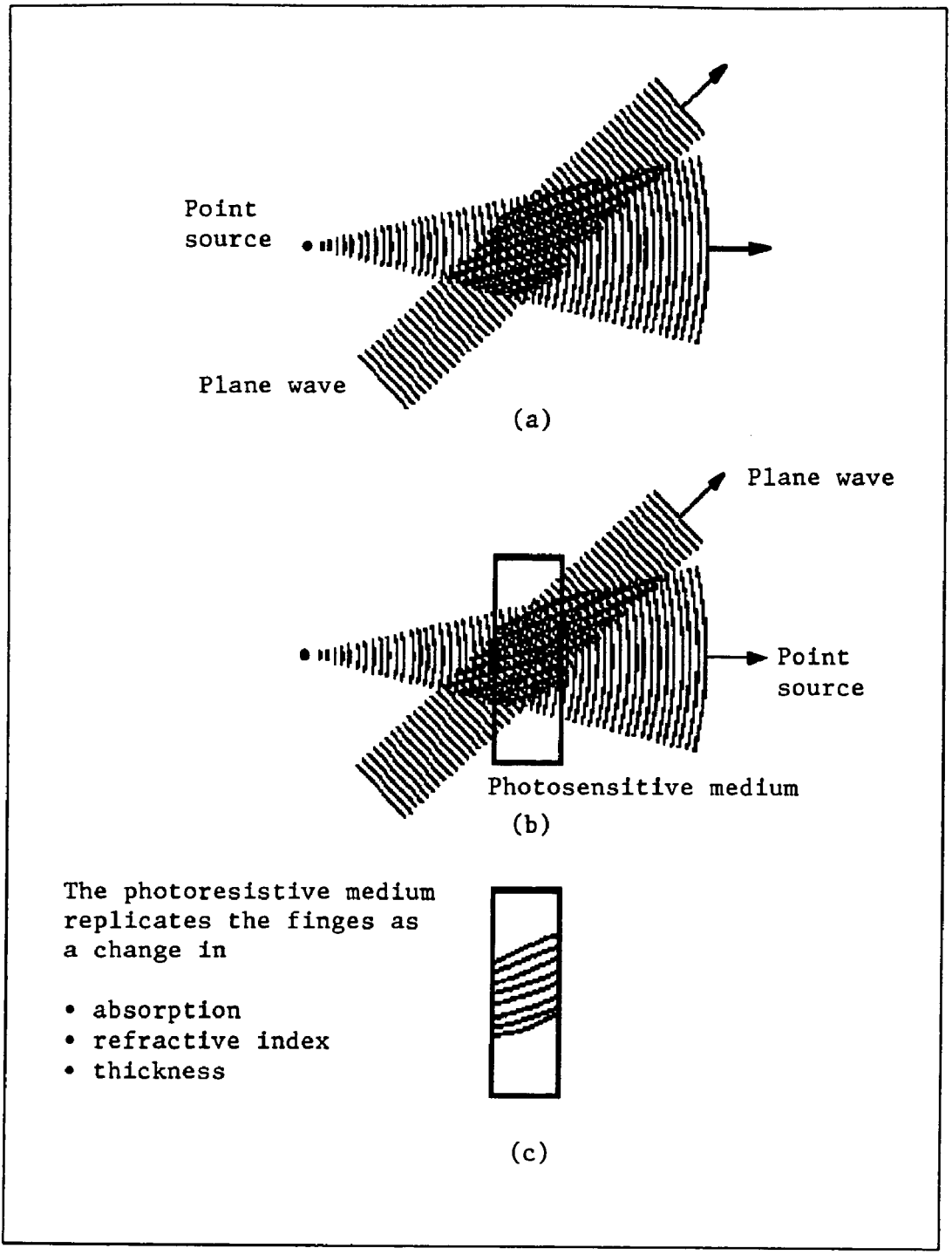
FIG. 1, in three parts, shows how information, using embodiments of the invention, may be recorded into a photosensitive material.

Various embodiments of this invention relate to photosensitive ink, the application of the ink to a substrate, the exposure of the coated substrate to electromagnetic radiation (or other energy source) to create refractive index (or other optical) changes in it, and the effect that the changes (e.g. a stored phase pattern such as a grating) has on incident light when subjected to thereafter. The invention also relates to the creation (e.g. storage) of specific patterns of refractive regions, resulting from exposure to specific patterns (such as interference patterns) of the writing energy, that result in diffraction phase gratings, holograms, mirrors, filters, lenses, compensated lenses, data, barcodes, micro-optics, waveguides, fibers, lasers, OPOs, doublers, optical circuits, antennas, prisms, polarizers, optical switches, confinement structures, other optical components, and arrays of thereof. The invention further relates to methods, systems, mechanisms, and machines for creating such refractive index changes and/or phase patterns in substrates coated with photosensitive ink.

The invention also relates to mechanisms for launching light into, onto, through, and off of phase patterns thusly created to produce the intended end (bulk) optical or holographic effect. The invention also relates to methods for encoding and storing data, holographically, onto substrates thusly prepared, and to methods for retrieving, reading, and decoding the stored data. Specifically, the invention relates to an entirely new class of optical elements and components, whose performance has traditionally only been realized in bulk form, including printable holographically stored data, that can be manufactured in part using printing technologies, and subsequently effected (e.g. exposed to laser light) to impart optical performance therein. The invention can therefore be used to create optical elements, store data, create interesting visual effects, create covert security features and effects, to channel light and energy across distances (including curved surfaces), to reflect, deflect, focus, magnify, change frequency and wavelength of, correct for, and otherwise alter and control light in useful and potentially in low cost ways.

A photosensitive ink could nominally be made from a liquid or monomer binding or carrier agent into which small particles of 1) photosensitive glass (such as [1]$GeSiO_2$, [2]$H_2$:$GeSiO_2$, $SiO_2$, $B:SiO_2$, $Sn:SiO_2$, [3]Ce, Ag, $F:SiO_2$, soda-lime, leaded, borosilicate, oxide, non-oxide, or others) and/or 2) photosensitive crystals (lithium niobate, SBN, or others) and/or 3) photosensitive polymers (Dupont HRF-150, Norland optical cements, or others) can be mixed. The photosensitive pigment particles may also contain other dopants or semiconductors such as tin, boron, phosphorous, aluminum or other metals, etc, and may also be loaded with molecular hydrogen to increase their photosensitivity. The ink could also be comprised of a liquid that can undergo a photosensitive refractive change on its own with no additional particles or components.

[1] A. I. Gusarov, et, al, Optics Letters, Vol 25, No. 12, Jun. 12, 2000.
[2] Raman Kashyap, "Fiber Bragg Gratings", Academic Press 1999, ISBN #0-12-400560-8.
[3] O. M. Efimov et al, Optics Letters, Vol 25, No. 23, Dec. 1, 2000.

The photosensitive ink can be applied to a substrate (paper (such as new or recycled cellulose based paper), plastic, plastic cards, glass, metal, wood, textiles, leather, etc) via a printing or coating process. The photosensitive ink can be flood coated onto a large substrate area, or selectively printed onto small-localized regions such as in the denomination value (number) on the corner of a banknote. The ink can then be dried (solvent evaporation) or cured by electromagnetic radiation such as ultraviolet (UV) or otherwise stabilized/hardened to secure the particles. After being printed/coated with such ink, the substrate can be subsequently exposed to UV (or other wavelengths such as for instance visible, IR, or pulsed [4]IR) causing it to undergo a change in refractive index of either the particles, the binder, or both, in the regions of exposure. {In glasses, this refractive index change is a result of various physical phenomena including the formation of color centers and the densification of the material, which leads to a volume change in the material, which leads to stress induced birefringence. In crystals it can be the result of the photorefractive effect and the creation of space charge fields[5]. In polymers it can result from the creation of new bonds as monomers are turned into polymers in the material[6].}

[4] D. Homoelle et. al (Nick Borelli), Optics Letters, Vol 24, No. 18, Sep. 15, 1999.
[5] See pertinent publications by Jeff Wilde.
[6] Demetri Psaltis, Geoffrey Burr, IEEE Computer, February 1998, 0018-9162/98.

Exposure of the printed photosensitive region and the resultant creation of a refractive index change on the substrate is intended to impart information (holographic data storage[7]), visual effects (holograms or iridescence patterns for instance), or other optical phenomena (diffraction gratings, filters, lenses, or mirrors for instance) on the substrate in the form of a phase change or a phase grating. Such a phase or holographic grating could take the form of a simple periodic grating for diffracting light (say for instance to make an anti-copy feature on a document), or a more complex structure such as a visible holographic feature similar to those seen on credit cards. The phase grating could be constructed to produce structural patterns of different refractive regions such as those found on butterfly wings[8,9,10,11] producing highly iridescence effects. It could also be used to create lenses, mirrors, fibers, waveguides, Fresnel lenses, arrays of lenses, micro lenses, micro lens arrays, and light management films for displays including those made from micro lens arrays, and a host of other traditionally bulk optical or discrete optical components.

[7] See publications on holographic data storage.
[8] P. Vukusic et al, Nature Vol 410 March 2000.
[9] P. Vukusic et al, Nature Vol 410 March 2001.
[10] Chris Lawrence, Applied Optics, Vol 41, No. 3, Jan. 20, 2002.
[11] P. Vukusic et al, Proc. R. Soc. Lond. B. (1999) 266, 1403-1411.

The invention can also be used to create security and information features on documents (and other substrates) as a means of establishing authentication. For instance, personal, corporate, governmental, ownership, title, dated, and other data including photographs, fingerprints, aliases, etc., can be digitally stored as a hologram on a passport or visa in this manner. The information can be later read out from the document by a reader designed to illuminate the selected region properly and decode the diffracted pattern[12].

[12] Demetri Psaltis, Geoffrey Burr, IEEE Computer, February 1998, 0018-9162/98.

The refractive pattern can be in the form of alphanumeric characters or a bar code that has been scanned in with a laser, or it can be in the form of an interference pattern that is created by intersecting coherent laser beams. Digital information can be encoded onto one of the beams by sending it through a spatial light modulator prior to the intersection of the beams that causes the interference pattern[13]. Information that is stored this way can be read back by using a laser beam to reconstruct the pattern. Methods include phase contrast microscopy and diffraction, both of which can be used to reconstruct phase information from a grating in either transmission of reflection mode.

[13] See publications on holographic data storage.

Certain embodiments of the invention will include one ore more of the following components:

1.) An ink that will respond to electromagnetic radiation by changing its refractive index. The ink consists of a binding agent with particles of glasses (such as $GeO_2$:$SiO_2$ glass that have been loaded with hydrogen). When exposed to UV radiation of the appropriate wavelength and intensity, the refractive index of the glass particles can be changed.

2.) Method for applying ink to substrate—such as printing, coating.

3.) Method for optically (or otherwise) altering the refractive index or other optical properties in select regions and in controllable ways on the printed or coated substrate.

4.) Method for optically storing information (e.g. digital information) on substrate materials coated with said ink in the form of, for example, a grating or hologram. (Holographic data storage.)

5.) Method for optically retrieving stored information. (Holographic data storage.)

Optical fibers made from doped mixtures of germanium dioxide and silicon dioxide glasses form the backbone of the telecommunications industry. Typically produced from MCVD performs which have been heated and pulled, these fibers contain a core and a cladding that enables light at a wavelength of ~1.5 microns to propagate through them for thousands of kilometers. Though the fiber core material is extremely transparent, small absorption losses eventually cause degradation in the signals requiring them to be amplified. The erbium doped fiber amplifier is also an optical fiber that is pumped at 980 nm to generate light at 1.5 microns via the $^4F_{13/2}$ to $^4I_{15/2}$ transition in $Er^{3+}$. These amplifiers build up gain by reflecting the 1.5 micron emission from one end of the fiber to the other using integrated gratings as mirrors, thereby stimulating additional light at this wavelength. The internal integrated mirrors are fabricated by physically recording fiber Bragg gratings, into the ends of the fibers using ultra-violet light from a laser.

Figure 2:
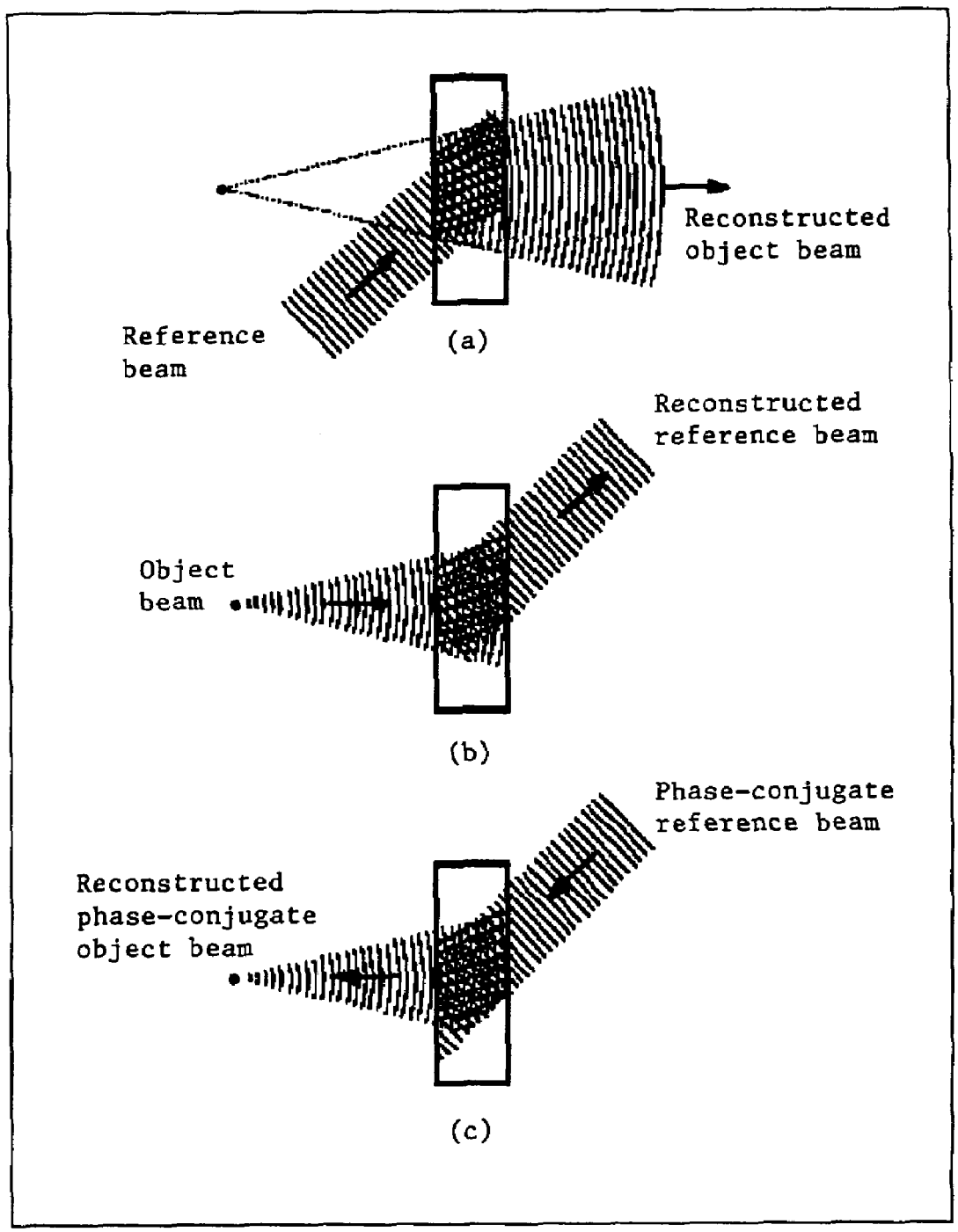
FIG. 2, in three parts, shows how the information, which may be recorded in the manner shown in FIG. 1, may be retrieved from the medium.

Hydrogen loaded germanosilicate glasses display a photosensitivity that enables UV light to induce defects in the fiber core that changes the refractive index by large amounts ($\Delta n=0.03$). These changes can be made to be permanent resulting in a grating that lasts for a very long time, even at elevated temperatures (500 C). The material system and process used to produce Bragg gratings in fibers, namely hydrogen loaded doped GeSi glasses, can be readily made into small particles for incorporation into printing ink, which will enable UV sensitive refractive regions to be integrated onto documents and other substrate materials. By printing photosensitive inks onto substrates, information in the form of serial numbers, dates, bar codes, fingerprints, photographs, video clips and movies, large volumes of information, etc can be stored in a phase grating and subsequently read out using light and optical detectors. Information encoded onto substrates in this manner can be completely covert, if desired, providing a means of securing documents against counterfeiting and forgery. Alternatively, it can be overt creating visual holographic effects including full color holograms. FIG. 1 shows how a coherent reference beam (planar wavefront) and an object beam (non-planar wavefront) can be intersected in a layer of photosensitive refractive recording media to write a phase grating in the material. The intensity peaks created by the interference pattern induce refractive index changes in the material, while at the nodes (intensity nulls) the material retains its original, unaltered index. A phase grating that can be permanently stored in this manner will yield its stored pattern upon re-illumination by a planar wavefront (see FIG. 2).

Certain embodiments of this invention have several components, which contribute to its uniqueness. They include a) the photosensitive optical particles such as those made from doped GeSi glass compositions and subsequently loaded with molecular hydrogen, b) the carriers or binders which have been loaded with a sufficient amount of the photosensitive optical particles to form an ink or coating (the "inks"), c) a printing/coating process for applying the photosensitive inks, d) an encoding process for creating and storing phase gratings in the substrate region on which the photosensitive material has been applied, e) a method for reading out digital information that has been stored in the grating, and f) for optical elements that do not require readout, a means of using them such as in an optical system (pair of eyeglasses, camera, etc).

a.) Photosensitive Optical Particles

The photosensitive optical particles can be fabricated from silicate and oxide glasses such as doped compositions of germanosilicate glass ($GeO_2:SiO_2$) that have been hydrogen loaded. Several such glass compositions are currently used for telecommunications fibers with boron doped high germania content (~30%) producing some of the highest Δn. The particles can be made small enough to enable printing for the required printing process (intaglio, offset, flexographic, flood coating, etc), which is typically between 100 nm and 100 microns in mean diameter. The particles can be fabricated via precipitation methods, spraying methods, grinding methods, or any method that provides the requisite particle size and composition, including grinding up fibers or bulk glass. The particles can also be incorporated with (molecular) hydrogen, possibly using the cold, high-pressure soaking method described in section 2.4.4 of Raman Kashyap's book titled Fiber Bragg Gratings, and assorted references. Once infused with hydrogen, the particles can be stored at low temperature (e.g. −70° C.) to extend the duration of their sensitivity, until they are ready to be mixed with the ink/carrier and printed/applied. Molecular hydrogen will remain in the glass particles for a period of time at room temperature providing sufficient time to mix the inks, print the substrate, and encode the gratings. After a period of time at standard temperature and pressure, particles that have not been exposed to UV will lose hydrogen through diffusion, reducing their sensitivity to the writing wavelengths. This helps to prevent new gratings from being subsequently written over the original gratings, thereby altering or erasing the intended content. If necessary this process can be accelerated by heating the documents after the information has been encoded. Photosensitive particles that have lost their infused hydrogen due to diffusion out of the particles, for instance, can be "reconstituted" (so to speak) by exposing them once again to the process of hydrogen loading. This sensitizing process can happen several times if need be as the hydrogen causes no adverse reactions in the glass.

It should be noted that the use of hydrogen loaded germanosilicate glass particles is only one example of a photosensitive particle that could be used. Other compositions of glasses including doped glasses and semiconductor-doped glasses can also be used. Additionally, crystals, such as lithium niobate and SBN, and even particles of polymers (Dupont's HRF-150 for instance) could also be used to provide this feature. Hydrogen loaded Ge silicates have been identified as a material that can provide enhanced photosensitivity, for a reasonable shelf life under appropriate storage conditions, and which then looses its enhanced photosensitivity shortly after being written (again under proper conditions), but which provides permanent gratings.

Additionally, since various transition metals, heavy metals, semiconductors, rare earth halides, gases, etc. (H, Li, Na, K, Rb, Cs, Fr, Be, Mg, Ca, Sr, Ba, Ra, Sc, Y, La, Ac, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, B, Al, Ga, In, Tl, C, Si, Ge, Sn, Pb, N, P, As, Sb, Bi, O, S, Se, Te, Po, F, Cl, Br, I, At, He, Ne, Ar, Kr, Xe, Rn, Ce, Pr, Nd, Sm, Eu, Gd, Tb, Dy, Ho, Er, Tm, Yb, Lu) can be added to glasses to impart color and other sensitizing properties, pigmented particles can also be used as the photosensitive materials.

b.) Inks and Coatings

Photosensitive inks can be fabricated by mixing the photosensitive refractive pigments with inks and other fluid media that can dry or otherwise solidify or harden. Standard inks can be used including pigmented inks and/or clear colorless inks. Efforts can be made to minimize the overlap of absorption lines or curing frequencies in the ink so that they do not substantially overlap the UV writing frequencies of the particles, typically around 190-300 nm, but sometimes in the visible or IR spectral regions. If $H_2:GeSiO_2$ particles are used, mixing into the inks can be done rapidly to minimize the time the particles are exposed to high (room) temperatures prior to encoding, as the hydrogen will begin to diffuse back out of them. Since storing temperatures for the hydrogen loaded particles are at ~−70° C., it is likely that they will have to be brought to somewhat of an elevated temperature (~room temperature) prior to integration into the ink. (Prior to hydrogen loading, the particles do not require refrigeration.) The ink can be solidified by drying, elevated temperature thermal curing, UV exposure (e.g. to provide polymer cross linking) taking care that the UV wavelength does not induce unwanted and premature refractive changes in the pigment. Particles can be mixed into the inks through processes such as ball milling, vortex mixing, stirring, etc.

Though the use of photosensitive particles has been suggested as the primary means of formulating the ink, photopolymers that provide optically induced refractive changes can also be used, without the need to add additional particles. Such materials, once solidified on the substrate either by evaporative hardening, thermal curing, UV curing, or other means, would then be subject to the same types of exposure conditions to store phase gratings as refractive index changes.

c.) Printing

Once the photosensitive particles have been integrated into ink, or the ink has been prepared, the ink can be printed onto an appropriate substrate material (cellulose based paper, reflective surfaces, mylar and plastics, metals, etc) using any printing process. It may be helpful to let the ink dry/cure before the gratings are exposed to the encoding UV source, to ensure that the particles are firmly fixed in position. This helps to make sure that once the particles are exposed to UV and their refractive index is permanently altered, that they stay in the positions required to provide the diffractive response that the reading hardware will be looking to detect. If the modified particles drift or move after the encoding process, then the phase grating pattern may be altered uncontrollably and the recorded information can be lost or degraded.

The photosensitive optical regions can be printed over top of other printed, colored, or altered regions of the substrate to disguise their presence or effect the appearance of the document in some desired way. It may also be possible to print over top of the printed photosensitive regions, either before or after the phase grating has been encoded. The primary concern here is that pigments or other constituents of the overlapping inks not absorb too much of the wavelengths (of UV) used to write and read the gratings. Additionally, it may also be possible to incorporate other pigments directly into the ink with the photosensitive optical particles to color them in some desired manner.

d.) Encoding of Data

Figure 3:
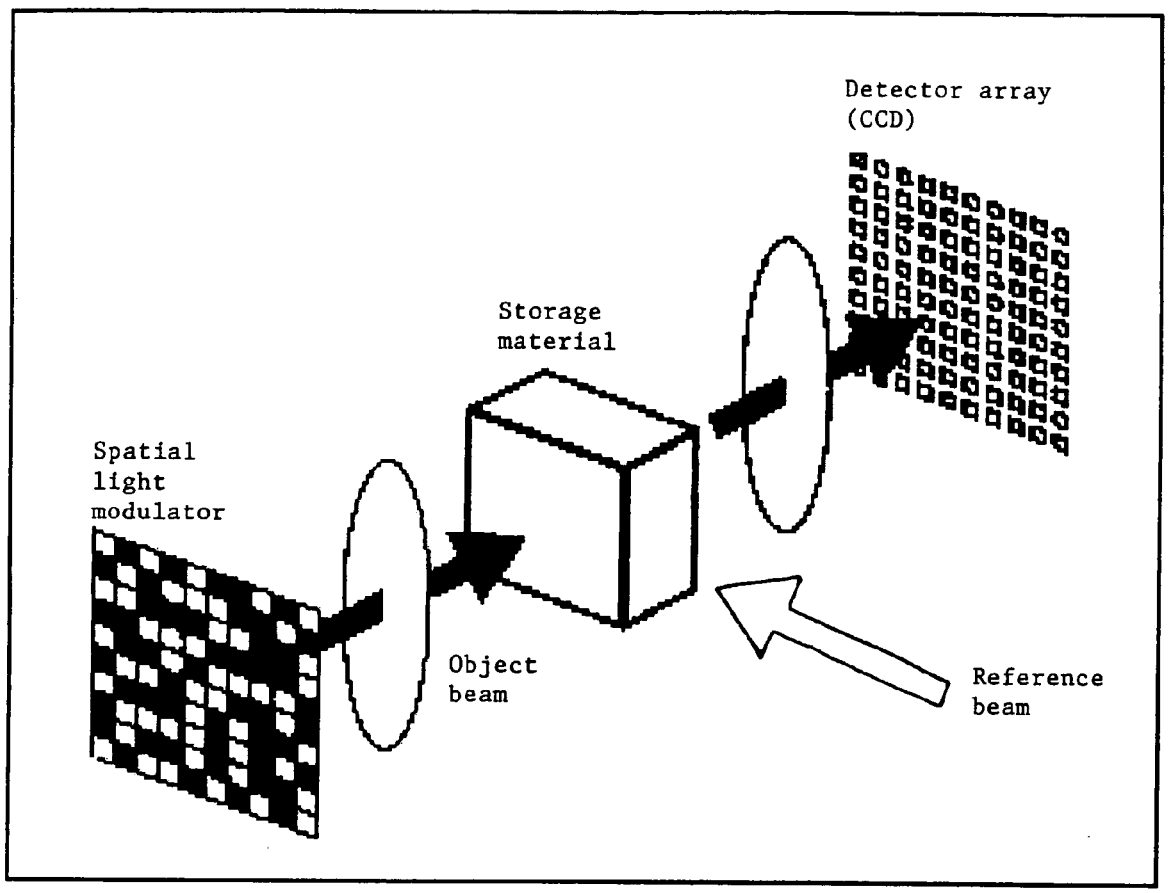
FIG. 3 shows an example of a holographic data storage system.

Any region of the substrate thusly printed may have its refractive index altered upon exposure to ultra violet (or other) light (or other electromagnetic radiation) of the requisite wavelength, intensity, and duration. Data encoding is the process by which a specific pattern is recorded in the printed optical area, in a manner that enables it to be subsequently read back to provide access to this information. Data can be recorded as a phase grating via a number of mechanisms including exposing the printed surface to an interference pattern that has been created by intersecting a collimated beam with a planar wavefront (reference beam) with one that has propagated through a spatial light modulator onto which a specific character sequence has been effectively imprinted as an amplitude mask (object beam). Such encoding schemes are typically used for bulk or volume holographic data storage intended to store tens of terabits of information per cubic centimeter. These systems do not in any way address, mention, or even allude to the storage of smaller amounts of data onto printed substrates. The optical encoding hardware for volume holographic data storage can be applied to this application however to write gratings into thin layers of ink which have been printed onto substrate. (FIG. 3 shows an example of a holographic data storage system.) Data can also be recorded by scanning a UV laser across the printed surface, using any appropriate scanning methodology, to write information directly without the use of interference. Such information could be a bar code, an alphanumeric character sequence or a pre-calculated grating pattern, each of which can be read back with a plane wave reference beam to produce a diffraction pattern that is characteristic of the recorded data. Regardless of the mechanism used to impart the refractive pattern (phase grating) onto the printed region of the substrate, it can be made permanent and the reconstructed diffraction pattern can be used to identify the printed object and correlate it to other information.

e.) Read Out

Reconstruction the object beam to retrieve the stored information from the encoded phase grating can be done in multiple ways. One example is through the use of diffraction, which is done by exposing the hologram to a planar wavefront (reference beam) and detecting the intensity variations on a spatially pixilated detector (see FIG. 3). This can be done in reflection or transmission mode, and is independent on whether the information was stored holographically using an interference pattern or was written directly by a scanned laser. Diffraction or holographic based readout methods will differentiate a low level signal (0.01) from no signal (0.0) at all, typically from 0 to 0.01. Another way is through the use of interference or phase contrast microscopy, which will differentiate a totally "on" signal (1.00) from slightly decreased signal strength (0.99), typically from 1 to 0.99. Because a totally "on" signal tends to be noisy, it is easier to differentiate low signals from zero than it is to differentiate high signals from 1.

Other read out methods including phase conjugate readout, may also be possible. It is noteworthy to mention that unlike holographic data storage systems that are intended to store terabits of information in a cubic centimeter, in which the writing and the readout systems are both integral to a system, this concept allows for the separation of the functions of "encoding" and "reading" the data not just between system hardware, but perhaps over a period of time that might extend to several years. Thus, phase conjugate readout may not be as useful as the optical components may not necessarily constitute the same path.

f) Other Optical Elements and Components

In addition to the storage of digital data onto printed substrate materials, the functions of several types of discrete optical components can be imparted onto printed substrate by exposing the substrate to the proper patterns of intensity varying waveforms at the proper wavelengths. Lenses, for instance, can be made in a variety of diameters and with a variety of optical powers by controlling the diameter and radial intensity distribution of a laser that is used to expose the substrate. Such lenses can be integrated onto printed plastic (e.g. transparent plastic) or glass substrate material to provide for transparency. For such applications it may be important to minimize scattering of light by the refractive particles suggesting that they should be very small. Other optical elements include wavelength selective mirrors and filters, which can effectively reflect or transmit light, at specific wavelengths, as a function of the periodicity of the grating. Still yet other optical elements include waveguides, switches, fibers, optical paths and conduits, periodically polled structures, etc. Though not all optical components have been mentioned, the basic concepts of printing a layer and exposing it to radiation to create an optical element would still apply to the device.

In addition to printing a single layer to make a device, multiple layers could be printed, with different materials for instance, to yield different Δn's or different wavelengths of writing sensitivity (UV and IR). Multiple layered devices could be fabricated to provide multiple levels of performance in much the same manner as printed circuit boards provide multiple channels of conductivity for electrical circuits.

Related Variations or Modifications

In addition to printing the photosensitive material onto substrates, it could also be sprayed on or the substrate could be dipped/submerged in it. Additionally, it will likely be possible to incorporate the germanosilicate particles directly into the plastic (PVC, PMMA) substrate that some currencies, such as the Australian or Mexican banknotes, are made from. This would enable the windowed areas in these types of banknotes to be encoded with gratings. The GeSi particles could also be incorporated into plastics such as those that are used for containers, which would enable gratings to be encoded into bottles, packaging materials, or other objects.

In addition to storing small amounts of data onto a substrate, it may also be possible to store large amounts such as the 9-10 Gbytes required for DVD movies. This would enable for instance an entire movie to be encoded onto a small substrate the size of a standard credit card or smaller.

Another variation of the invention is the fabrication of printable optical elements, in particular printable diffractive imaging lenses that will focus light. In such an embodiment, transparent plastic or glass substrate material would be coated (printed, sprayed, etc.) with the photosensitive ink, or doped with the photosensitive particles as described previously. A diffractive pattern can be imparted onto the substrate material in such a manner so as to create an optical element that will act so as to focus incoming light. Such elements are similar to Fresnel lenses, but use a diffraction pattern rather than refractive rings to act on the incoming wavefront. In this manner, lightweight, low cost planar substrate material can be written with a focal length, and subsequently cut with an external contour to conform to an outer perimeter shape factor (circular or other shapes to fit into a pair of glasses or other optical fixture) without having to grind the surface shape to a particular curvature. Using diffraction in flexible planar substrates to focus multi-wavelength light, rather than surface curvature in a mono-refractive media, will substantially reduce the cost of manufacturing lenses and other optical elements. Chromatic aberrations can also be reduced with the appropriate phase grating in the material. Such optical elements can be recorded either by the use of interference patterns, or again by the use of scanned laser beams as very high precision control can be attained with deflection technologies. Additionally, multiple foci can be integrated into the same element to create bifocal, tri-focal, and multi-focal elements. Writing gratings in such a manner would substantially reduce the costly manufacturing requirements of many optics, especially those used for vision correction, including contact lenses. The transition between the two focal regions could be very smooth, eliminating the sharp edge that is customarily ground into such corrective optics. The substrate material could be printed and then stored at low temperature to prevent out gassing of the molecular hydrogen, prior to exposure.

Holograms have been incorporated into plastic and paper substrates for some time for security purposes. They can be found on the packaging of software and other products, currency, government issued forms of identification such as driver's licenses and passports, and even on credit cards. On currency, for instance, they are first fabricated then affixed to the paper with an adhesive. This method of incorporating the security feature requires many additional steps and results in a final product that does not have high integrity. Exposure to heat, water, and other elements degrades the applied feature causing it to delaminate, with machine-washing nearly destroying it. Furthermore, the holographic images that are incorporated are all the same and do not enable unique features such as serial numbers or other information to be incorporated into each document.

Other forms of holographic media that could be applied directly to a substrate, such as the polymer made by InPhase (Bayer) Systems, is sensitive to ambient light which requires it to be applied in complete darkness and subsequently written in darkness then fixed to preserve the information. This process does not readily lend itself to printing currency as it is done on large industrial presses in well-lit rooms.

This invention enables holographic recordable ink to be printed directly onto the substrate, and subsequently exposed to record and encode information onto the substrate. Information so encoded can be machine-readable and covert, or it can be used to create a visible hologram that can be readily seen as a virtual image. Exposure to ambient room light has little or no effect on the material prior to grating writing, as the wavelength region that it is photosensitive to is narrow, in the UV, and requires substantial intensity of exposure. Such exposure intensities can be readily achieved with a UV laser operating at the requisite wavelength, and a laser is required to generate the interference pattern anyway. By using a spatial light modulator to impart serialized or document specific information directly into the hologram, any grating can be written including a different one for each document. Current document feeds for currency require 30 notes per second to be written which provides for 0.03 sec exposure. This is sufficiently slow to enable phase gratings to be encoded in production printing applications.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of forming a diffractive imaging lens capable of focusing light, the method comprising:
    applying a material onto a substrate, wherein the material is a photosensitive material applied with carrier agent, wherein the carrier agent is a liquid or monomer and the photosensitive material is a particle having a mean diameter between 100 nm and 100 microns; and
    exposing a selected portion of the photosensitive material to electromagnetic radiation, thereby altering at least one optical property of the material to create the diffractive imaging lens.

2. A method as in claim 1 wherein the material is a photosensitive ink and wherein the applying comprises a printing operation and wherein the at least one optical property comprises a refractive index and wherein the diffractive imaging lens comprises a grating.

3. A method as in claim 2 farther comprising:
    applying a further material, which is photosensitive, onto the substrate;
    exposing the further material to create a second refractive index to visible light which is different than the refractive index.

4. A method as in claim 1 wherein the material is a photosensitive ink and wherein the applying comprises a printing operation which prints the photosensitive ink as a layer onto the substrate, which is transparent.

5. A method as in claim 4, the method farther comprising:
    cutting the transparent substrate to conform to an outer perimeter shape.

6. A method as in claim 5 wherein the outer perimeter shape corresponds to a perimeter of a frame which is designed to hold the diffractive imaging lens, and wherein the selected portion is less than all of the material.

7. A method as in claim 1 wherein the substrate is substantially planar and the diffractive imaging lens is formed without grinding a surface of the diffractive imaging lens.

8. The method of claim 1, wherein the photosensitive material is selected from the group consisting of: photosensitive glass, photosensitive crystal, photosensitive liquid, photosensitive monomer and photosensitive polymer.

9. The method of claim 8, wherein the photosensitive material is photosensitive glass loaded with molecular hydrogen.

10. The method of claim 8, wherein the photosensitive crystal is selected from the group consisting of: lithium niobate and SBN.

11. The method of claim 8, wherein the photosensitive monomer or polymer is selected from the group consisting of Dupont HRF-150 and Norland optical cements.

12. The method of claim 8, wherein the photosensitive material further comprises dopants selected from the group consisting of: tin, boron, phosphorous, aluminum.

13. A method of forming a holographic medium comprising:
    applying a photosensitive material to a substrate;
    exposing a selected portion of the photosensitive material to electromagnetic radiation to record and encode information into the photosensitive material in a manner that enables it to be subsequently read back to provide access to the information; and
    heating the photosensitive material above standard temperature after exposing the selected portion to reduce the photosensitivity of the portion of the photosensitive material not exposed.

14. A method of forming a holographic medium comprising:
    applying a photosensitive material to a substrate;
    exposing a selected portion of the photosensitive material to electromagnetic radiation to record and encode information into the photosensitive material in a manner that enables it to be subsequently read back to provide access to the information; and reconstructing an object beam based on the photosensitive material to retrieve the recorded information from the encoded phase, wherein exposing the selected portion of the photosensitive material forms an encoded phase grating and wherein reconstructing an object beam comprises exposing the photosensitive material to a reference beam and detecting the intensity variations on a spatially pixilated detector.

* * * * *